United States Patent [19] [11] 3,936,684
Anselmino et al. [45] Feb. 3, 1976

[54] ANGULAR VELOCITY DETECTOR ASSEMBLY FOR WHEELS OF MOTOR VEHICLES HAVING ANTI-SKID BRAKE SYSTEMS

[75] Inventors: Giovanni Anselmino, Turin; Roberto Pozzetto, Collegno; Gianfranco Carollo, Turin, all of Italy

[73] Assignee: Fiat Societa per Azioni, Turin, Italy

[22] Filed: June 25, 1974

[21] Appl. No.: 482,932

[30] Foreign Application Priority Data
June 25, 1973  Italy.................................. 68882/73

[52] U.S. Cl............. 310/168; 248/74 R; 248/221 R; 248/230; 310/91
[51] Int. Cl.² .......................................... H02K 5/00
[58] Field of Search .......... 248/74 R, 221 R, 230 R; 310/91, 168, 155, 254

[56] References Cited
UNITED STATES PATENTS
1,470,529  10/1923  Gerber............................. 248/74 R
3,347,572  10/1967  Pfaff, Jr. et al................. 248/221 X
3,848,147  11/1974  Anselmino.......................... 310/168

*Primary Examiner*—Donovan F. Duggan
*Attorney, Agent, or Firm*—Sughrue, Rothwell, Mion, Zinn and Macpeak

[57] ABSTRACT

An angular velocity transducer assembly for a vehicle wheel, of the type comprising an electromagnetic pick up cooperating with a relatively movable toothed wheel in which the toothed wheel is carried by the vehicle wheel and the electromagnetic pick up is carried by a mounting support on a fixed part of the vehicle to which it is attached by a tie rod in the form of a U-bolt. The mounting support is formed as a shoe having an arcuately curved surface which is adapted to bear on the axle of the vehicle either over substantially the whole of the curved surface or at various different places spaced around the curved surface.

1 Claim, 2 Drawing Figures

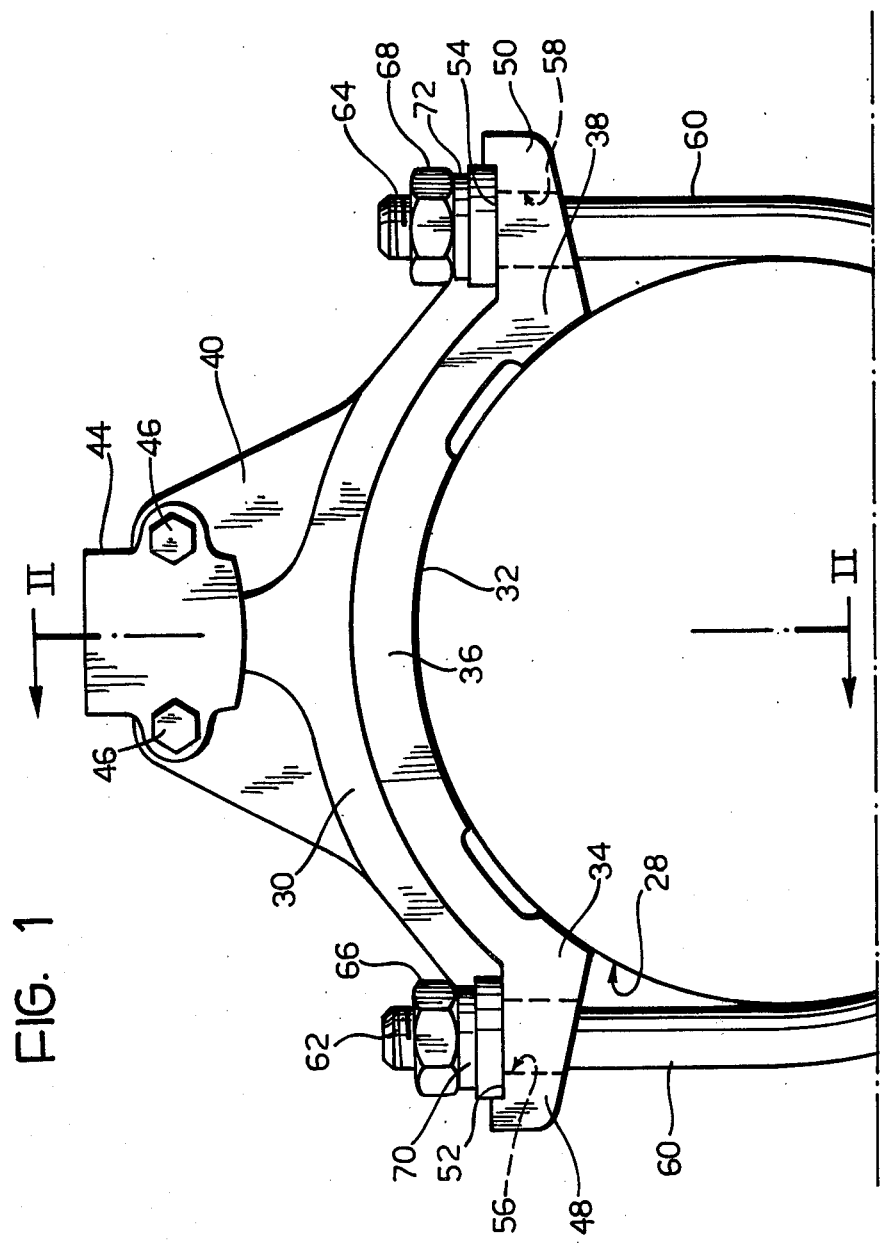

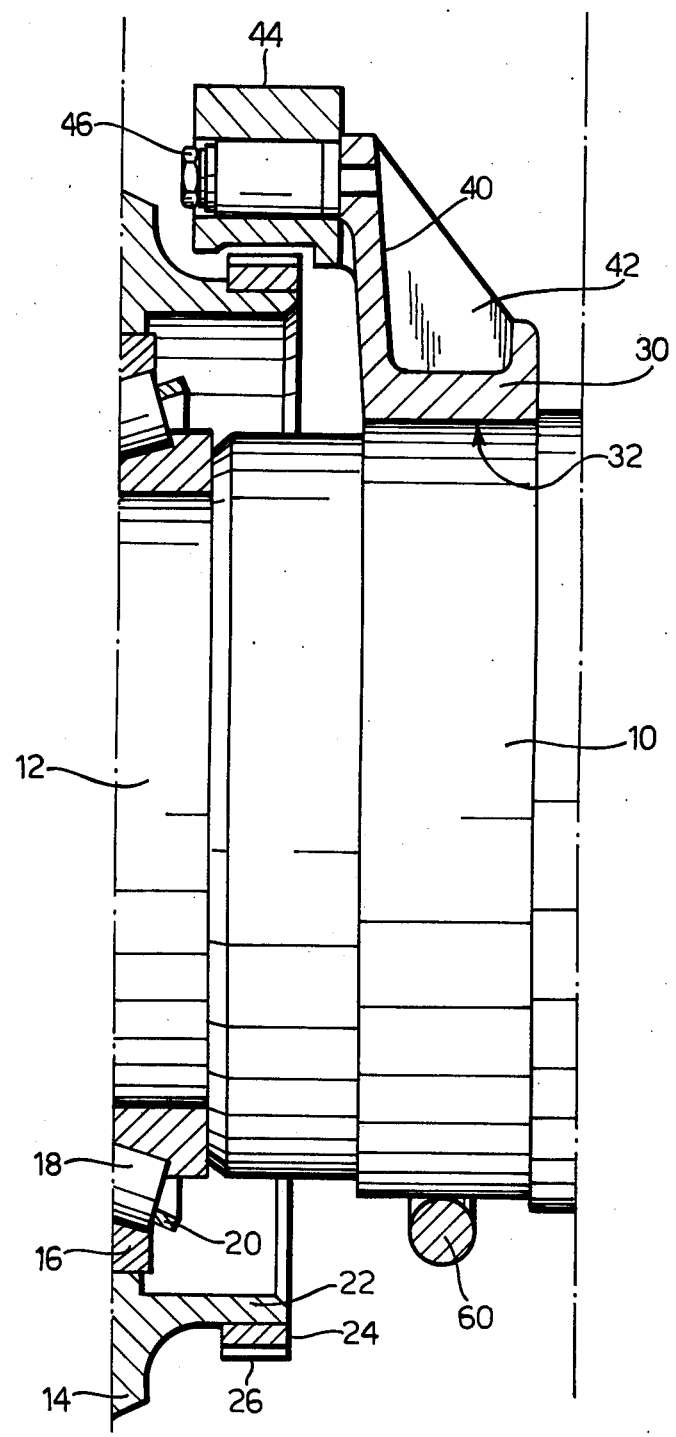

ANGULAR VELOCITY DETECTOR ASSEMBLY FOR WHEELS OF MOTOR VEHICLES HAVING ANTI-SKID BRAKE SYSTEMS

This invention relates to an angular velocity detector assembly for a vehicle wheel suitable for use in an anti-skid brake system, and particularly to an angular velocity detector assembly of the electromagnetic type which is mounted on a fixed part of a vehicle and cooperates magnetically with a toothed wheel on the vehicle wheel.

Embodiments of the invention are particularly advantageous for use on the rear axles of tractor vehicles or on the axles of trailer vehicles, but can also be used on other types of vehicles.

The object of the invention is to provide an angular velocity detector assembly which is simple and economical and which can be installed easily and in a short time.

The present invention seeks to provide an angular velocity detector assembly having a mounting arrangement which will ensure, even when used on surfaces which are not perfectly smooth, perfect positioning of the detector on its support and hence an accurate air-gap between the sensor and the toothed wheel, or tone wheel, fixed to the vehicle wheel, with which the sensor cooperates in determining the angular velocity of the wheel.

According to the present invention an electromagnetic transducer assembly suitable as an angular velocity detector for the wheel of a vehicle having an anti-skid brake system of the type comprising an electromagnetic pick up cooperating with a toothed wheel is characterised in that the toothed wheel is carried by the vehicle wheel, and there is a support for the electromagnetic pick up adapted to be carried on a fixed part of the vehicle, and a tie-rod for securing the said support to the said fixed part.

Preferably, the said support comprises a body adapted to bear upon an axle of a vehicle, the body having two lugs projecting therefrom, the lugs having holes through which the ends of the tie-rod extend when the assembly is fitted together, there being means for attaching the tie-rod to the support.

One embodiment of the invention will now be more particularly described, by way of example, with reference to the accompanying drawings, in which:

FIG. 1 is a side view, from one end of an axle, of an embodiment of the invention mounted upon a rear axle of a vehicle; and FIG. 2 is a sectional view taken along the line II—II of FIG. 1.

Referring to the drawings there is shown a wheel speed sensor including a magnetic pick-up 44 mounted on the rear axle 10 of a vehicle (not shown); the following description refers to a mounting for an angular velocity detector for an anti-skid brake system for mounting on a rear axle; it will be apparent, however, that this mounting arrangement can be used with slight modifications on other fixed parts of a vehicle.

A wheel 14 is carried at the end 12 of the axle 10 by means of rolling element bearings. An inner bearing 16 is shown in FIG. 2, the rollers 18 of this bearing are supported by a cage 20. The wheel 14 has a hub 22 on which there is mounted a wheel 24 having radially outwardly projecting teeth 26; the toothed wheel 24 is made of ferromagnetic material and serves as a tone wheel for the sensor; depending on the arrangement of the system, the teeth 26 can be provided on the wheel hub 22, directly by casting, or milling or by otherwise machining the hub 22. Alternatively it can be of added material, sintered or otherwise. The axle 10 has, adjacent the end 12, a section 28 in which the outer surface is machined, not necessarily to very close tolerances, for a portion extending over about half the circumference; upon this section is carried a support 30 in the form of a curved shoe the radius of which is equal to the radius of the axle. The arcuate base 32 of the shoe 30 may rest entirely on the section 28 of the axle, or as shown in the drawing may have three relieved portions leaving three lands 34, 36, 38 which engage the axle 10. The shoe 30 has a bracket 40 which extends radially with respect to the arcuate surface 32 and perpendicular to the axis thereof; the bracket is reinforced by stiffening webs or ribs 40 and 42.

The electromagnetic pick up 44 is held on the brackets 40 by means of axial screws 46; exact adjustment of its position, in order to ensure the required spacing between the pick-up 44 and the toothed wheel 24, is effected by means of slotted holes, shims, or other known means, not illustrated. The electromagnetic pick-up may be of any suitable type; for example, of the type described in our U.S. Pat. No. 911,937. The shoe 30 has two lugs 48, 50 projecting from opposite ends thereof. The upper surfaces 52, 54 of the lugs are flattened and substantially coplanar; if, as in the illustrated embodiment, the arcuate surface 32 does not rest entirely upon the axle, the lands 34, 38 which bear on the axles are positioned adjacent the lugs 48, 50. The lugs 48, 50 have respective through-holes 56, 58 through which pass the ends 62, 64 of a tie rod 60 which may be made for example in the form of a U-bolt as shown in the drawing. The tie rod may be made of steel or other similar material; it passes beneath the axle 10 and the ends 62, 64 of the tie rod are threaded and the diameter of the arms is slightly less than the diameter of the through-holes 56, 58. The U-bolt 60 is held in place by means of nuts 66, 68 screwed onto the threaded ends 62, 64, there being washers 70, 72 between the nuts and the shoe 30. The preferred angular position can be selected before the nuts 66, 68 are tightened to clamp the U-bolt 60 and the shoe 30 to the axle 10, so as not to interfere with any other possible rotating members which may be in the vicinity, the adjustment may be further modified, if required, by calibrated shims between the shoe 30 and the axle.

Naturally the form and dimensions of the parts of the detector, as well as the manner of attaching the pick up support shoe 30 to the U-bolt, may be widely varied without nevertheless going beyond the scope of this invention.

We claim:

1. In an electromagnetic angular velocity transducer assembly for a vehicle wheel of the type comprising a toothed wheel and an electromagnetic pick-up device relatively moveable with respect to said toothed wheel upon rotation of said vehicle wheel upon which said toothed wheel is mounted, a mounting support for said electromagnetic pick-up comprising a curved body having a substantially semi-cylindrical surface adapted to be mounted on a cylindrical shaft, means securing said electromagnetic pick-up device adjacent the midpoint of said body intermediate the end thereof, a pair of recesses formed in said semi-cylindrical surface of said body adjacent to, but spaced inwardly from each end of said body to reduce the thickness of said body, an apertured lug integral with an extending outwardly from each end of said body, curved tie rod means adapting to extend around said shaft with the opposite ends thereof extending through said apertured lugs and threaded means for securing the ends of said tie rod to said lugs; said semi-cylindrical surface of said body between said recesses being substantially greater than the distances from said recesses to the ends of said body while the reduced thickness of said body in the vicinity of said recesses allows for the flexing of the ends of said body upon tightening of said threaded means to bring the ends of said body into contact with a shaft having a radius of curvature less than the radius of curvature of said semi-cylindrical surface of said body.

* * * * *